Sept. 15, 1936.　　　　F. A. QUIROZ　　　　2,054,564
VARIABLE SPEED UNIT
Filed June 12, 1933
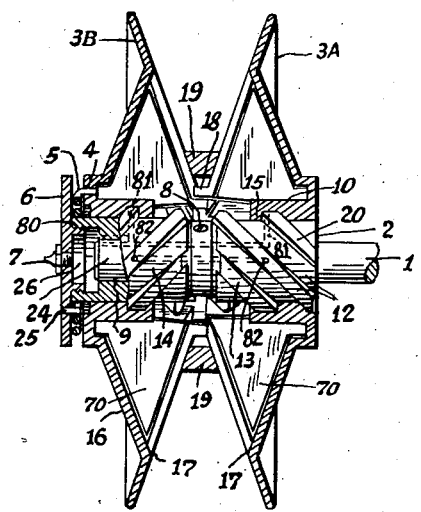
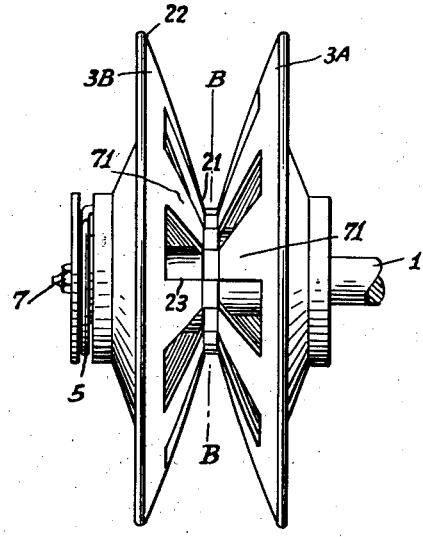
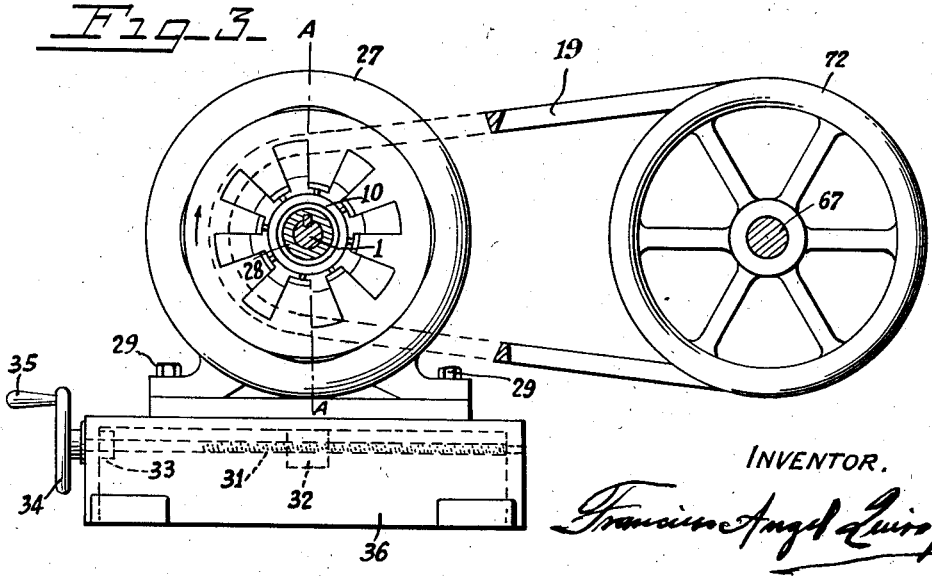
INVENTOR.

Patented Sept. 15, 1936

2,054,564

UNITED STATES PATENT OFFICE 2,054,564

VARIABLE SPEED UNIT

Francisco Angel Quiroz, Brooklyn, N. Y.

Application June 12, 1933, Serial No. 675,363

3 Claims. (Cl. 74—230.17)

This invention relates to variable speed units using V belts as the means for transmitting power in which the effective diameter of the pulley is automatically changed by the varying tension of the belt.

One of the objects of this invention is to provide a simple, efficient, and thoroughly practical power transmission, which is inexpensive to manufacture, and entirely reliable in operation.

Another object is to provide a simple variable speed transmission which is silent, smooth running in operation, and compact in design.

Another object is to provide a variable speed power transmission composed of independent pulleys, in which the means of controlling the effective diameter of one pulley changes the speed of the other pulley.

Another object is to provide a variable speed power transmission which automatically takes care of the stretching of the belt as well as the slipping of the same, and keeps the belt tension proportional to the load of the driven pulley, thereby allowing the belt to relax when there is no load in the device which is being driven by the transmission.

A further object is to provide a transmission of the above mentioned character in which the belt is always in alignment with the driving and driven pulleys, and in which the belt tension is not maintained by springs but is maintained by the load carried by the belt itself. Other objects will be obvious or in part pointed out herein.

The invention, accordingly, consists in the features of construction, combination of elements, and arrangement of parts, and the scope of the application which will be indicated in the following claims.

In the accompanying drawing, in which is illustrated one of various possible embodiments of the mechanical features of my invention:

Fig. 1 is in part a cross section along the axis of rotation of the pulley as shown by line A—A, in Fig. 3, showing the shaft in full and the threaded sleeve partly broken.

Fig. 2 is front view of the assembled pulley showing the coned faced intermeshing flanged discs.

Fig. 3 is a side view of an electric motor mounted on a sliding base, showing the pulley in cross section along the line B—B of Fig. 2, and also showing the driven shaft, the driven pulley and the connecting belt.

Similar reference characters refer to similar views throughout the drawing.

Referring now to the drawing, and more particularly to Fig. 1, there is shown a shaft 1, which can be the driving shaft of the motor or the driven shaft of any device or machine. On said shaft 1 is mounted a pulley or sheave which constitutes the most important part of this transmission. The sheave is composed of a double threaded sleeve 2, the intermeshing cones 3A and 3B, a spiral spring 5, a cap 6, a grease valve 7, and a set screw 8. The double threaded sleeve is of a cylindrical form and has a hole 9 bored along the axis of the sleeve to fit the driving or driven shaft 1, as the case may be. In said hole 9 a key-way 24 is cut in, to engage with the corresponding key 11, of shaft 1. On the outside of this sleeve and around the periphery there are a number of threads or grooves 12 cut at right hand for about half the length of the sleeve as shown in 13, and cut left hand on the other half as shown in 14 resembling very much a herringbone gear. The purpose of these threads is to engage with similar threads 15 cut in the hub of the intermeshing cones 3A and 3B as shown in 15, and force said intermeshing cones to move back and forth against each other when they tend to rotate around the sleeve 2 by the pull of the belt whenever an adjustment is made. The number of threads cut in sleeve 2 is immaterial. There could be only one thread or only one groove, provided they are cut at the proper angle in order that the wedge action of the belt will be able to force the intermeshing cones 3A and 3B away from each other, regardless of the load carried by the belt. The intermeshing cones 3A and 3B, when they are at the maximum distance from one another, as shown in Figs. 1 and 2, tips 18 of the intermeshing sections 71 of one cone intermesh the tips 18 of the other cone, therefore when the coil spring 5 anchored at 25 in cap 6 screws the cone 3B towards the center of the sleeve 2 by means of the left hand thread at 14, the cone 3A is screwed also toward the center of the sleeve 2, by means of the right hand thread at 13, and due to the fact that it also is forced to rotate in the same direction as cone 3B by the intermeshing tips 18. The sleeve 2 is bored at one end a little larger in order to make the grease chamber 26 and to provide room to secure the cap 6 by means of a screw thread 80. This screw thread 80 in the pulley illustrated in Fig. 1 is right hand because the pulley is supposed to rotate clockwise, as is shown by the arrow in Fig. 3, but if the pulley is made to rotate in the opposite direction, then the threads in the sleeve 2 would have to be reversed, at 14 would be right hand and at 13 would be left hand, and the spring coil 5 would also have to be reversed, and it would be a left hand coil instead of a right hand coil as it is illustrated in Fig. 1. The thread 80 of the cap 6 is also made right hand or left hand as the case may be in order that the pull of the spring 5, at 25, will always tend to screw the cap 6 and prevent it from becoming loose. A grease valve 7 is used to fill chamber 26 with lubricant. The lubricant is forced by centrifugal force through the channels 81, shown in dotted lines, and out through holes 82, in order to keep the threads of sleeve 2 lubricated and allow the intermeshing cones 3A and 3B to move freely on sleeve 2.

The intermeshing cones 3A and 3B are preferably made with a short boss 10, which is threaded to fit the threads of the sleeve 2. From this boss 10 extends a cone-shaped disc 16 to a point 17 where the slotted cones 11 are supported. These slotted cones 11 are made rigid by the ribs 70 which extend to each section of the slotted cones 11 as shown by dotted lines 83 from the boss 10 and the cones 16. The surface of the slotted cones 3A and 3B is slightly curved from point 21 to point 22, in Fig. 2, in order to fit the slight variation which takes place in the angle of the V belt when said belt bends around the pulley at different operating diameters. This curvature is not essential, but is desirable as it tends to increase the life of the belt by making the proper angle at any diameter within the ratio of variation of the pulley.

The variable speed transmission which can be produced by the use of the pulley illustrated above can take many forms, but in order to illustrate the principle on which it operates, I have illustrated in my drawing one of the many possible forms in which this pulley can be operated.

In Fig. 3 I have illustrated an electric motor which is mounted on a sliding plate 30, and secured to the same by bolts 29; extending from plate 30 there is a threaded knot 32 through which screw 31 operates by means of a hand wheel 34 and a handle 35. A collar 33 keeps the screw in position. This is a very common construction of a sliding base. The purpose is to slide the motor 27 back and forth away and toward the axis of rotation of the driven pulley 72 and shaft 67.

The variable speed pulley complete as illustrated in Fig. 1 is mounted on a shaft 1 of the motor 27. The standard V belt 19 connects the varible pulley with a driven plain pulley 72 mounted on a driven shaft 67. The shaft 67 can be driven shaft of any machine or device which has to be driven at a variable speed.

The spring 5 tends to drive the cones 3A and 3B toward each other until the points 17 come together, but as the spring 5 is very light the cones 3A and 3B are pushed apart by the wedge action of the belt whenever the motor 27 is pulled away from the pulley 72 by means of the sliding base, until the operating diameter of the variable pulley is reduced to the minimum as shown in Figs. 1 and 2. On the other hand, if the motor 27 is moved toward the driven pulley 72, then the slackness of the belt will allow the cones 3A and 3B to come closer and closer until the maximum operating diameter of the pulley is obtained, that is, when the points 17 of each pulley come in contact.

It is easy to understand that the function of the spring 5 is only to bring in contact the intermeshing cones 3A and 3B with the belt 19 before the motor is started to operate. After the motor has started to rotate, the pull exerted on the belt 19 by the load it carries tends to screw the cones 3A and 3B toward each other, producing a clamping effect on the belt, which clamping effect increases as the pull in the belt is increased by its own load, thereby preventing the belt from slipping. In fact, at this point the spring 5 could be removed and the belt will remain as tight and in proportion to the load that it carries. This principle of operation prevents any slipping of the belt, because the tightness of the belt increases in direct proportion to the increasing load carried by the same. Therefore the belt may break but it can not slip.

It can be readily understood that the variation of speed obtained in the driven shaft 67 is produced by the variation obtained in the operating diameter of the pulley comprising the cones 3A and 3B, whenever the base plate and motor is slid back and forth toward the driven shaft 67.

As many possible embodiments may be made of the mechanical features of the above invention, all without departing from the scope of the invention, it is to be understood that all matter herein above set forth, or shown in the accompanying drawing is to be interpreted as illustrated and not in a limiting sense.

Having now described and ascertained the nature of my invention and in what manner the same is to be performed, what I claim is:

1. A variable diameter pulley comprising a bushing externally right hand threaded at one end and left hand threaded at the other end, a lubricant chamber at one end of said bushing and a hole for mounting said bushing to a shaft extending from the opposite end to said lubricant chamber, lubricant channels extending from the lubricant chamber to the threads of the bushing, two intermeshing conical members, having one of them a right hand threaded hub, and the other one a left hand threaded hub to engage correspondingly with the threads of the bushing, a plurality of laterally inclined fingers in each of said conical members overlapping each other's hub when the pulley is in a closed position and intermeshing the finger tips when they are in a full opened position, and a spring to force said intermeshing members into a closed position.

2. A variable diameter pulley comprising a bushing externally right hand threaded at one end and left hand threaded at the other end, a lubricant chamber at one end of said bushing, a hole for mounting said bushing to a shaft extending from the opposite end of said bushing to said lubricant chamber, lubricant channels extending from the lubricant chamber to the threads of the bushing, two intermeshing conical members, each one composed of a short truncal cone having a threaded hub extending inwardly from the smaller end of said cone, a larger slotted truncal cone welded together in an opposite position by radial ribs extending from the surface of the short cone to the sections between the slots forming the fingers of the intermeshing members, the threaded hubs of said intermeshing cones engaging correspondingly with the threads of the threaded bushing, and a spring to force into a closed position said intermeshing cones.

3. A variable diameter pulley comprising a bushing externally right hand threaded at one end and left hand threaded at the other end, two intermeshing conical members, with the surface slightly convexed, with a curvature to produce a variable angle to fit the variable angle of contact of a V belt at the different operating diameters, one of said conical members having a right hand threaded hub and the other one a left hand threaded hub to engage correspondingly with the threads of the bushing, a plurality of laterally inclined fingers in each of said conical members overlapping each other's hub when they are in a closed position, and intermeshing the fingers' tips when they are in a full opened position, and a spring to force said intermeshing members into a closed position.

FRANCISCO ANGEL QUIROZ.